No. 898,223.  
PATENTED SEPT. 8, 1908.

J. D. JOHNSON.  
MOLD FOR FORMING TILES.  
APPLICATION FILED AUG. 28, 1907.

WITNESSES  
W. U. Swartz  
G. B. Fleming

INVENTOR  
Jas. D. Johnson,  
by Bakewell, Byrnes & Parmelee,  
his Attys.

THE NORRIS PETERS CO., WASHINGTON, D. C.

UNITED STATES PATENT OFFICE.

JAMES D. JOHNSON, OF JEANNETTE, PENNSYLVANIA, ASSIGNOR OF THREE-FOURTHS TO GEORGE W. BLAIR, OF PITTSBURG, PENNSYLVANIA.

MOLD FOR FORMING TILES.

No. 898,223.  Specification of Letters Patent.  Patented Sept. 8, 1908.

Application filed August 28, 1907. Serial No. 390,475.

*To all whom it may concern:*

Be it known that I, JAMES D. JOHNSON, of Jeannette, Westmoreland county, Pennsylvania, having invented a new and useful Mold for Forming Tiles, of which the following is a full, clear, and exact description, reference being had to the accompanying drawings, forming part of this specification, in which—

Figure 1:
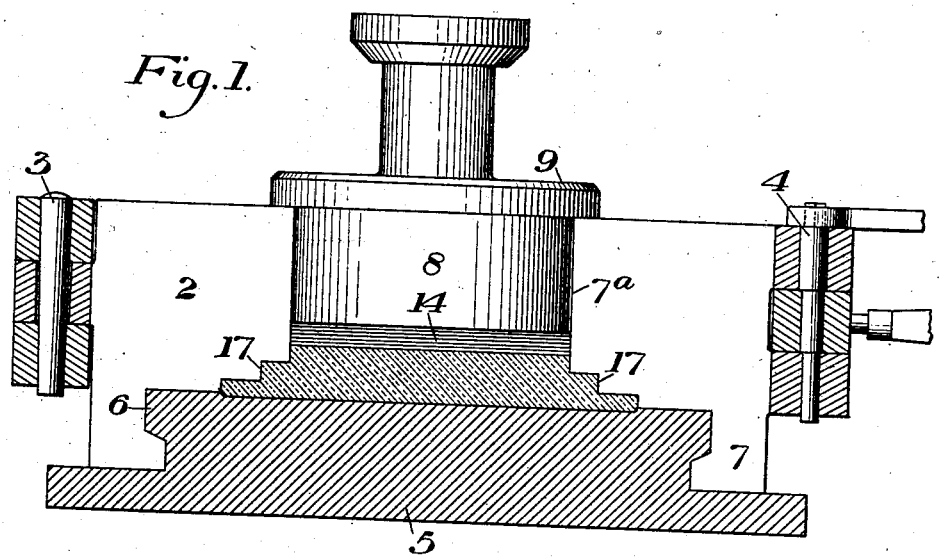
Figure 2:
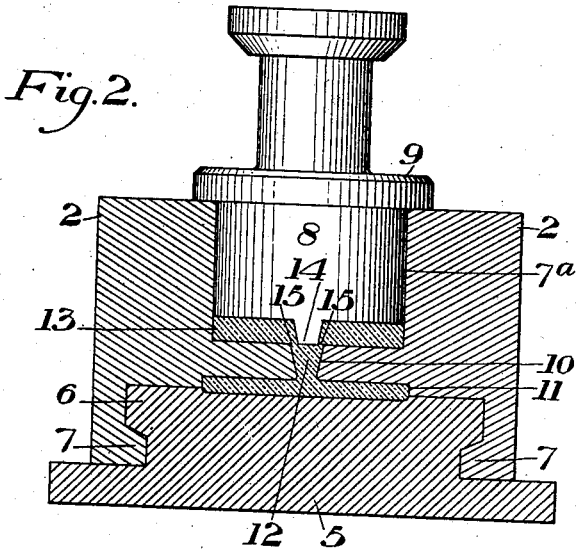
Figure 3:
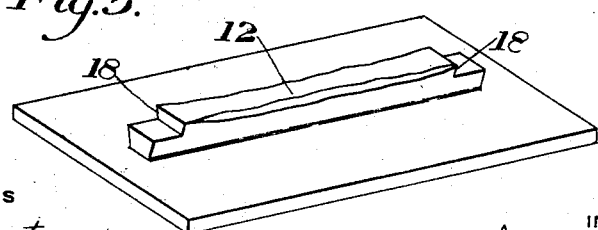

Figures 1 and 2 are vertical sections of a mold embodying my invention, taken in planes at right angles to each other; and Fig. 3 is a perspective view showing one of the tiles made by the mold, in inverted position.

My invention is designed to provide a mold for the formation of tiles having a dovetailed longitudinal rib or projection on the under face and adapted to be secured to bricks for the purpose of forming facings therefor, in the manner more fully described and claimed in my pending application of even date herewith, Serial No. 390,473.

The present invention is designed to provide a simple form of mold in which tiles of this character can be cheaply and rapidly made, and which is so constructed that tiles formed thereby will have completely formed and finished edges, so that a grinding of the edges is obviated.

Referring to the accompanying drawings, the numeral 2 designates the body portion of the mold which is parted on a central longitudinal plane, the two sections thereof being connected by a hinge pin 3. These sections may be secured in outward relation by any suitable means such as the eccentric pin 4.

5 designates the bottom member of the mold having the raised flange portion 6 which is engaged by the flanges 7 of the mold body sections 2. Formed in the section 2 is a cavity or chamber 7ª in which is arranged to work a close fitting piston 8, actuated by any usual or suitable means, and having a stop collar 9. The bottom wall of the cavity or chamber 7ª is formed with a central longitudinal slot or opening 10 extending vertically therethrough, and communicating at its lower end with a mold-forming cavity 11 in which the tile is formed. This cavity 11 is shown as being formed partly in the body sections 2 and partly in the bottom member 5. The lateral walls of the slot 10 converge toward their lower ends for the purpose of giving the desired dove-tail or under-cut formation to the tile ribs 12 which are formed in said slot.

In operation, a batch of hot glass is placed in the bottom of the chamber 7ª, and the plunger is then actuated to force the glass downwardly through the slot 10, which forms a well, into the mold-forming cavity 11 which it fills to form the tile body. Part of the glass also fills the slot 10 to form the rib 12. Inasmuch as it is necessary to place more or less excess glass in the chamber 7ª, the rib portions 10 of the tiles will be connected with a body of glass of greater or less thickness, formed by this excess, in the bottom of the chamber 7ª, as shown at 13 in Fig. 2. For the purpose of enabling this excess body of glass to be readily broken from the tile, the under face of the plunger 8 is provided with a longitudinally-extending cutting-off rib or projection 14 whose lower end is arranged to extend a short distance into the upper portion of the slot 10, and thereby forming thin necks or webs 15 which can be readily fractured. The ribs 12 are preferably of less length than the length of the tiles, and for this reason, the slot 10 is of less length than the mold-forming cavity 11, as shown in Fig. 1. The end walls of this slot are also preferably offset, as shown at 17 for the purpose of forming the shoulders 18, at the ends of the ribs 12, these shoulders marking the end breaking points of the webs or necks 15. By thus bringing these breaking points at a greater distance from the ends of the tile, there is less danger of the latter being injured in breaking off the residue body of glass. The plunger chamber 7ª is made of considerably smaller cross-sectional area than the cross-sectional area of the mold forming cavity, so that a head of glass will be present in the said chamber to feed the mold cavity without choking.

The advantages of my invention result from the construction of the mold whereby the tiles are formed by forcing the glass through a well into a forming cavity whose forming walls are in fixed relation to each other, and independent of the plunger. Also in the construction whereby the undercut ribs are formed and are enabled to be readily detached from the residue of glass without injury to the tile body. It will be further noted that the only unfinished edges on the tile are those formed where the webs or necks 16 are broken. These edges, however, do not require to be ground or finished, since they are not exposed when the tile is in use. The mold body being formed in separable sections, such sections can be readily opened to permit the removal of the finished tiles after the plunger has been withdrawn.

The mold may obviously be adapted to the formation of tiles having different forms of ribs 12 and I therefore do not limit myself to its use for forming the particular tiles illustrated and described.

Various other changes may be made in the details of construction and arrangement by those skilled in the art without departing from my invention, since what I claim is:—

1. A mold body having a plunger chamber therein, said chamber having an opening in its bottom wall, a mold-forming cavity below the said opening, and extending transversely thereof, the opening extending throughout the greater portion of the length of the mold cavity, and a plunger adapted to enter said chamber and force the glass into and through said opening and laterally into the mold-cavity in both directions from said opening, substantially as described.

2. A mold body composed of separable sections and inclosing a cavity or chamber, the bottom wall of the cavity or chamber having a longitudinal slot or opening therethrough, a mold cavity with which said slot or opening communicates at its lower end, and a plunger having a rib or projection on its lower face in line with said slot or opening; substantially as described.

3. A mold body having a cavity or chamber therein formed with a longitudinal slot or opening in its bottom wall, the lateral walls of said slot or opening converging downwardly into a mold-forming cavity, and a plunger having a cut-off rib or projection on its lower face in line with the slot or opening; substantially as described.

4. A mold body having a cavity or chamber therein adapted to receive a plunger, the bottom wall of the cavity or chamber having a slot or opening therein communicating at its lower end with an inclosed mold cavity, said slot or opening having shoulders or offsets at its ends, and a plunger having a cutting-off projection on its lower face in line with the said opening and arranged to partially enter the same; substantially as described.

5. A mold-body having a chamber therein to receive a plunger, the bottom wall of said chamber having an extended longitudinal slot therein which communicates with an underlying mold-forming cavity, said slot being adapted to form a central longitudinal rib on the surface of the article formed in said cavity extending throughout the major portion of the length of said article, substantially as described.

6. A mold cavity having a slot in its upper wall communicating with a plunger chamber, and a plunger having a cutting-off projection in line with said slot; substantially as described.

In testimony whereof, I have hereunto set my hand.

JAMES D. JOHNSON.

Witnesses:
  GEO. B. BLEMING,
  GEORGE H. PARMELEE.